United States Patent [19]

Benjamin

[11] Patent Number: 4,557,455
[45] Date of Patent: Dec. 10, 1985

[54] RELEASABLE AND ADJUSTABLE SECURING DEVICE

[75] Inventor: Benjamin C. Benjamin, Flint, Mich.

[73] Assignee: Schmelzer Corporation, Flint, Mich.

[21] Appl. No.: 353,053

[22] Filed: Mar. 1, 1982

Related U.S. Application Data

[63] Continuation of Ser. No. 290,070, Aug. 4, 1981, abandoned.

[51] Int. Cl.$^4$ .............................................. A47G 1/24
[52] U.S. Cl. ................................. 248/496; 24/16 PB; 248/297.3
[58] Field of Search .................... 24/16 PB; 248/74.3, 248/222.2, 222.3, 297.3, 477, 478, 490, 496

[56] References Cited

U.S. PATENT DOCUMENTS

| | | | |
|---|---|---|---|
| 317,237 | 5/1885 | Stauffacher | 248/297.3 |
| 419,093 | 2/1893 | Edgerton | 248/297.3 |
| 722,311 | 3/1903 | Magerhans | |
| 971,060 | 5/1905 | Wallace | 248/496 |
| 2,943,831 | 7/1960 | Goss | 248/31 |
| 2,975,994 | 3/1961 | Goss | 248/496 |
| 3,537,146 | 11/1970 | Caveny | 24/16 PB |
| 3,900,923 | 8/1975 | Thomas | 24/16 PB |
| 4,272,047 | 6/1981 | Botka | 248/74.3 |

FOREIGN PATENT DOCUMENTS

| | | |
|---|---|---|
| 717256 | 10/1954 | United Kingdom . |
| 1144513 | 3/1969 | United Kingdom . |
| 1188241 | 4/1970 | United Kingdom . |
| 1186830 | 4/1970 | United Kingdom . |
| 1209283 | 10/1970 | United Kingdom . |
| 1229320 | 4/1971 | United Kingdom . |
| 1264097 | 2/1972 | United Kingdom . |
| 1314978 | 4/1973 | United Kingdom . |
| 1316862 | 5/1973 | United Kingdom . |
| 1578490 | 11/1980 | United Kingdom . |

Primary Examiner—William H. Schultz
Attorney, Agent, or Firm—Harness, Dickey & Pierce

[57] ABSTRACT

A device for releasably and adjustably securing objects relative to each other such as hanging a picture frame relative to a wall. The device includes a flexible elongated strap slidably received by a latch mechanism. The strap and latch mechanism have complementary locking teeth permitting movement of the latch mechanism in one direction on the strap but preventing movement in the opposite direction. Means are provided to maintain the teeth in disengaged relationship so that the latch mechanism may be freely moved in both directions relative to the strap.

39 Claims, 29 Drawing Figures

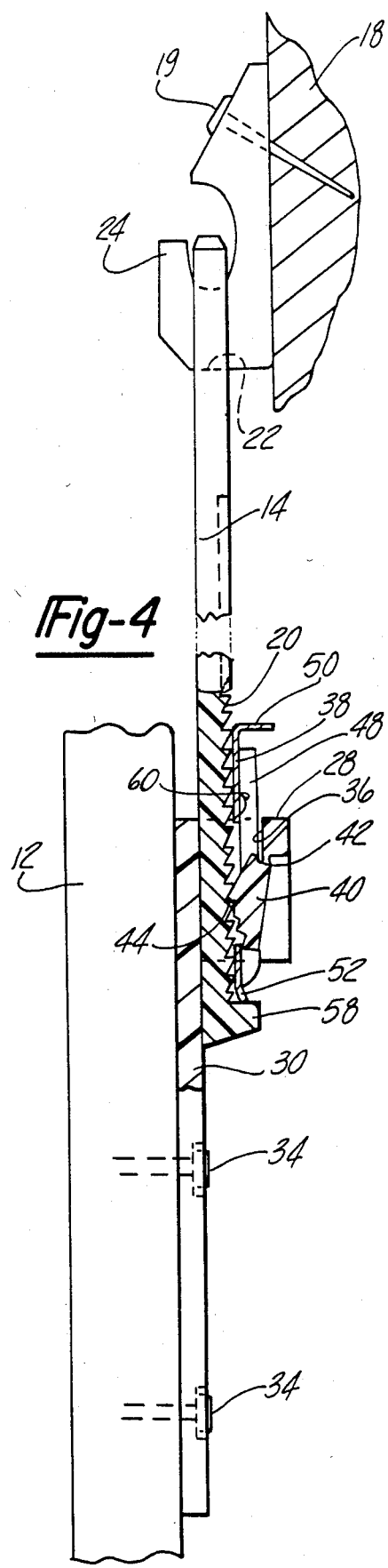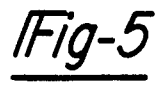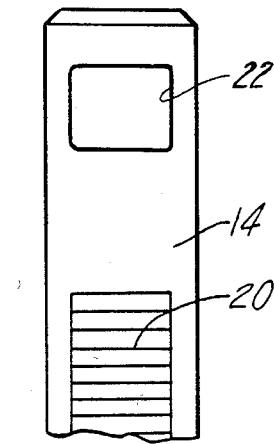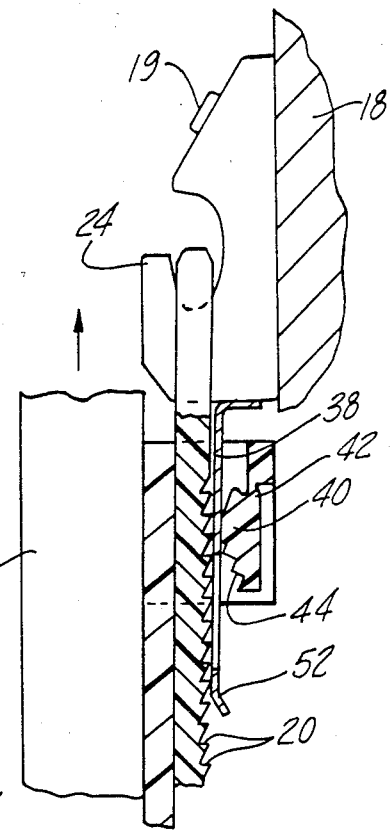

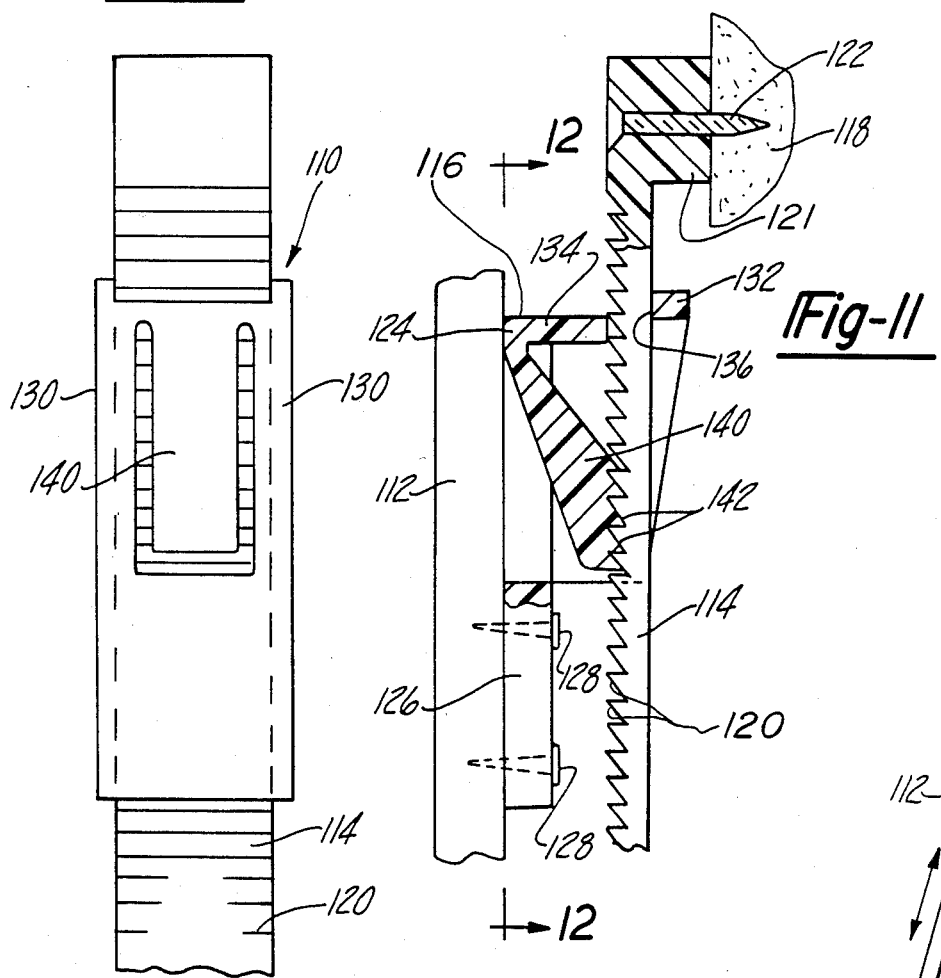
*Fig-12*
*Fig-11*
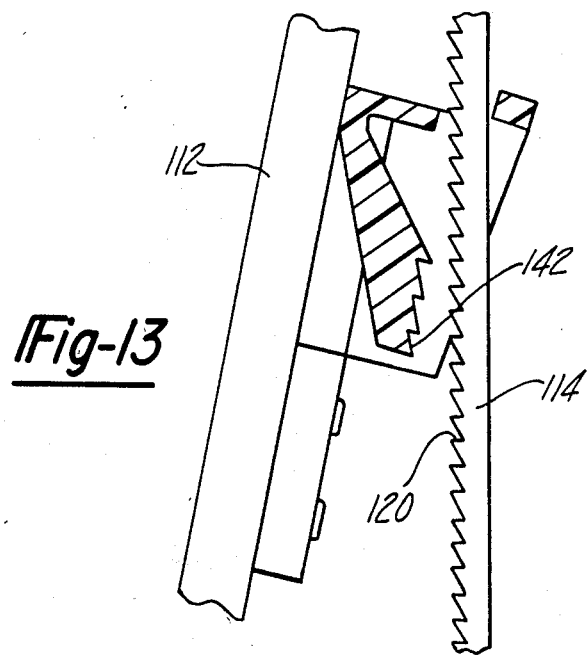
*Fig-13*
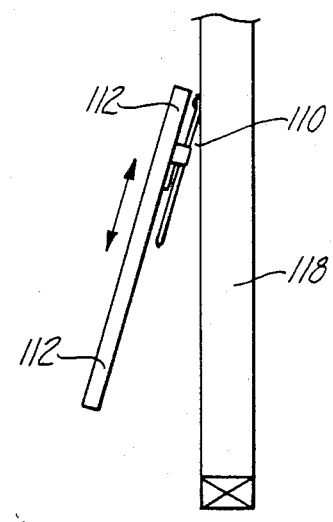
*Fig-14*

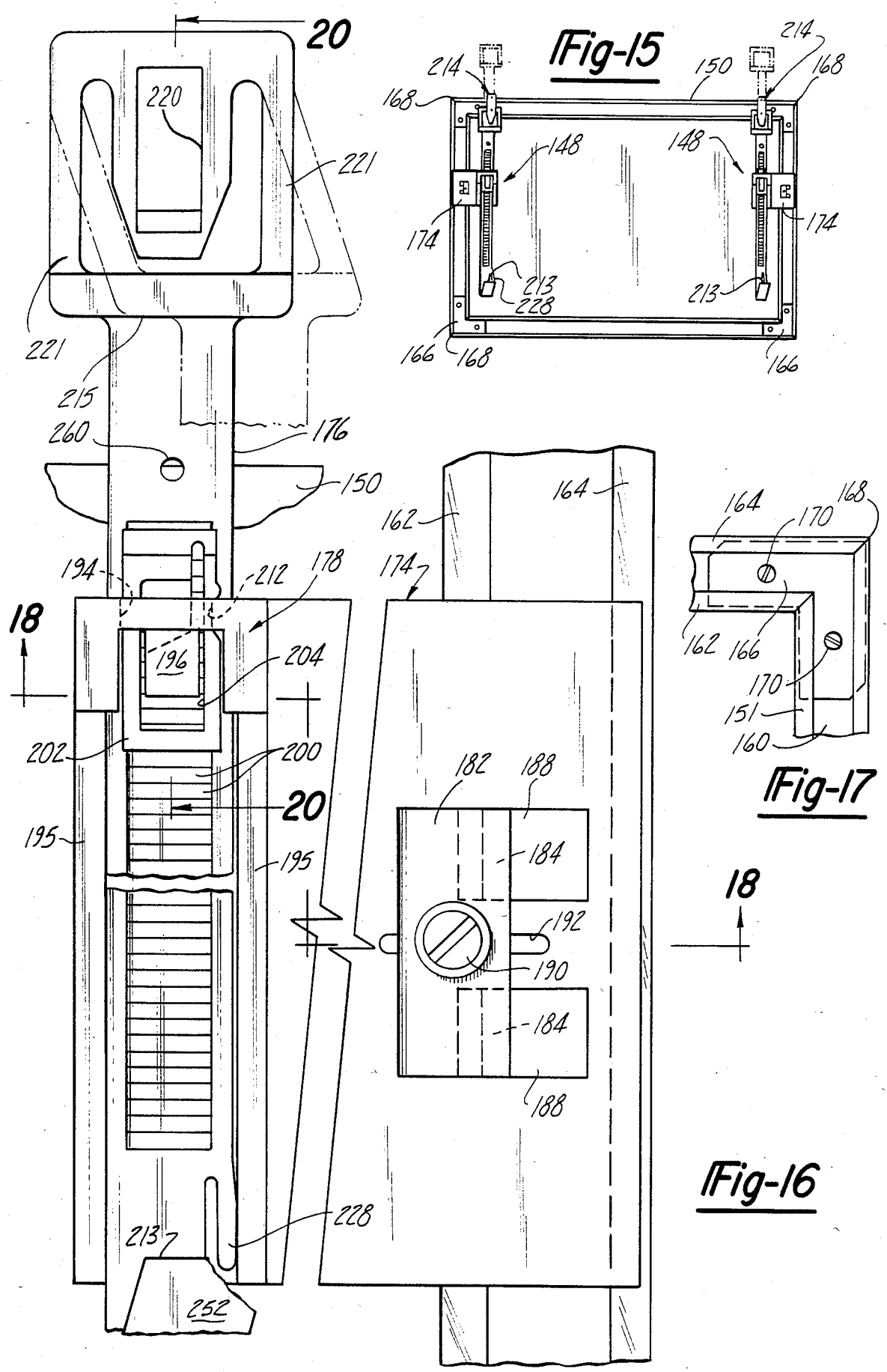

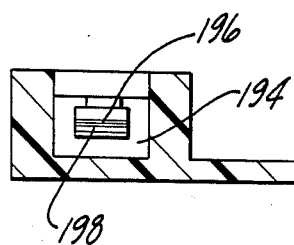
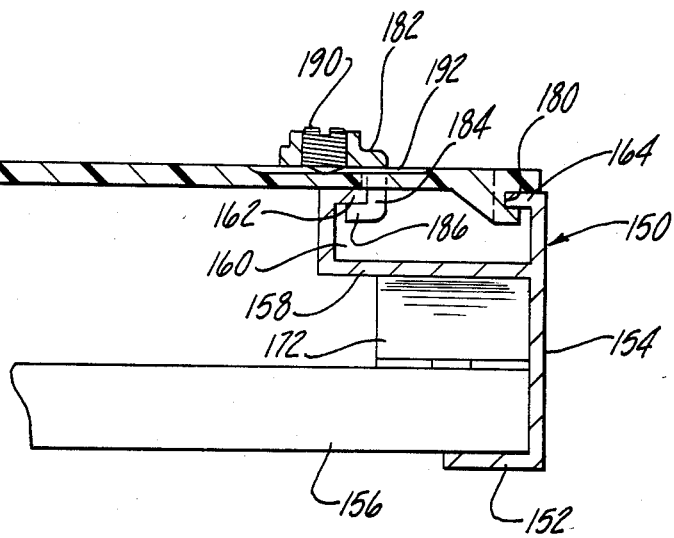
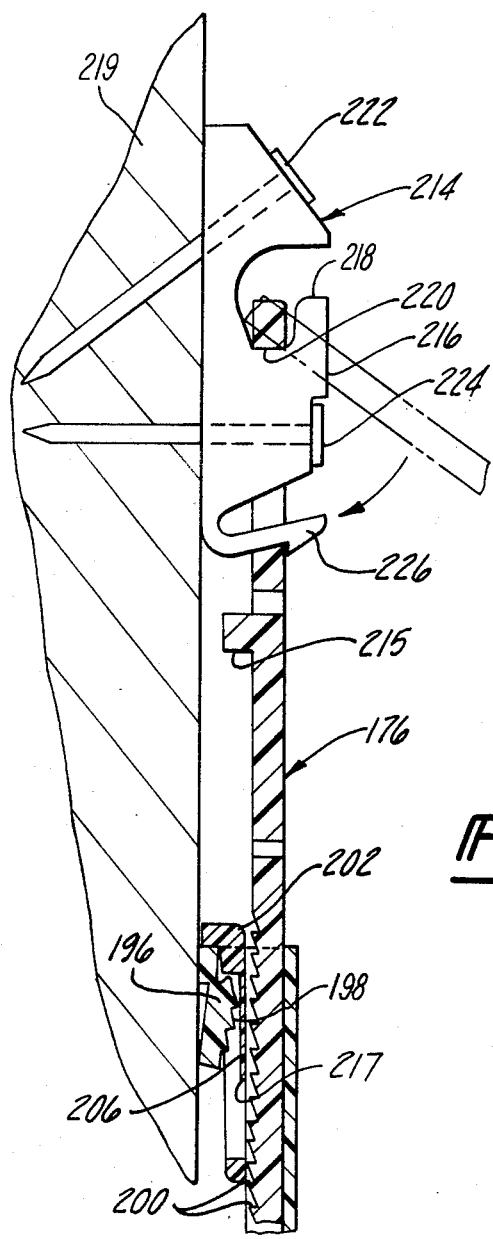
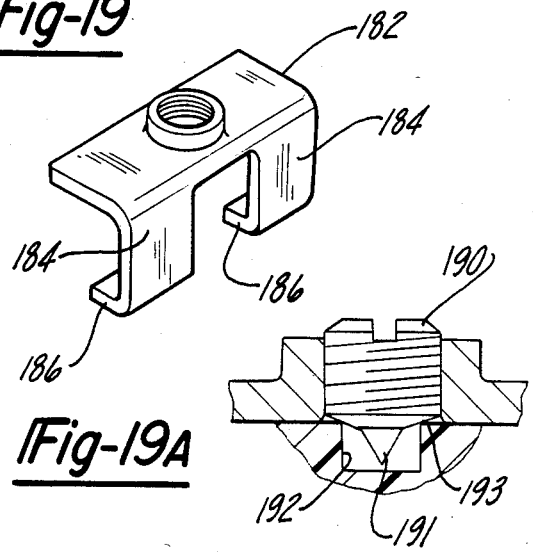
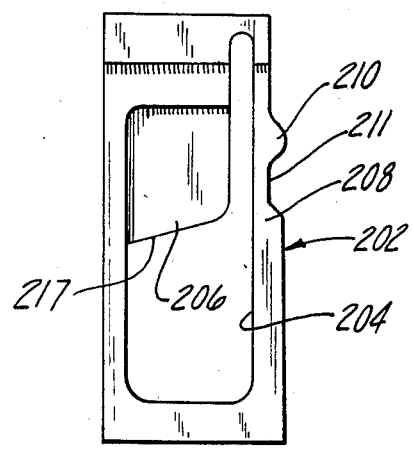

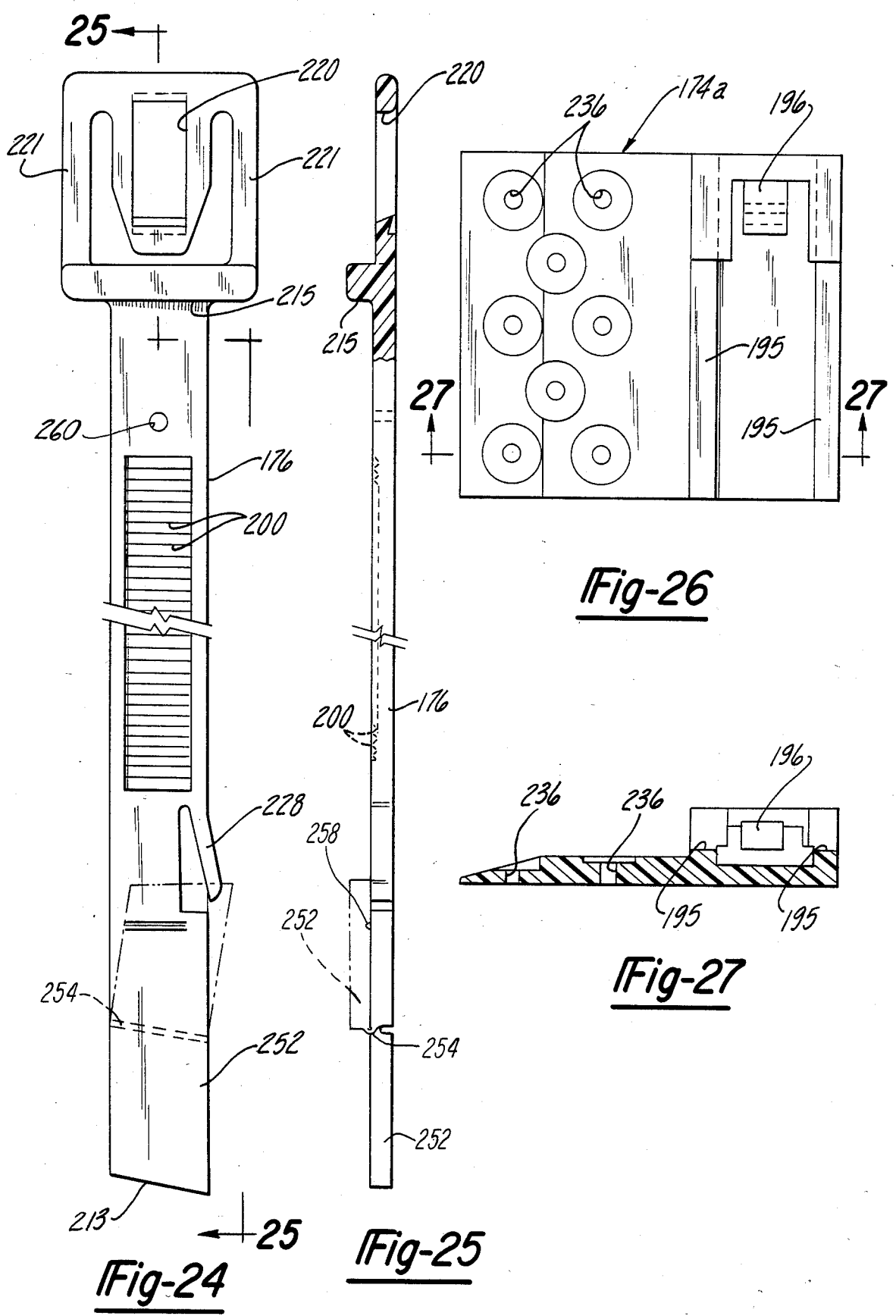

4,557,455

RELEASABLE AND ADJUSTABLE SECURING DEVICE

This application is a continuation of application No. 290,070 filed Aug. 4, 1981, now abandoned.

BACKGROUND AND SUMMARY OF THE INVENTION

This invention relates to devices for adjustably securing objects together or to a support and is particularly adapted for hanging pictures or the like.

There is a need for devices for securing objects together or to a support which permits releasable adjustment. Also some objects require adjustment so that adjacent portions can be leveled relative to each other. Examples of such objects are picture frames or the framework used to secure suspended ceilings. Some objects, particularly pictures, may require removal for cleaning and when replaced, require easy readjustment and releveling.

A variety of devices for hanging pictures and other framed objects such as mirrors or panels have been provided in which adjustment is possible but in almost all instances such arrangements require tools or actual handling or touching of the hanging device to make the necessary adjustments.

It is an object of the invention to provide a device for securing objects to a support or to each other which permits selective adjustment and engagement and disengagement of complementary lock elements relative to each other.

It is another object of the invention to provide a device for securing objects and which is particularly adapted for hanging pictures or other panels.

Still another object of the invention is to provide a picture or panel hanging device making it possible to adjust the vertical height of a panel relative to a wall without the use of tools.

A further object of the invention is to provide a picture or panel hanging device in which various adjustments can be made by manipulating the panel itself and without contacting or touching the device.

Yet another object of the invention is to provide an arrangement for hanging pictures or panels in which a pair of devices are used at opposite sides and in which careful alignment is not required since the device accommodates errors in attaching the hanging apparatus to the panel and wall.

Still another object of the invention is to provide a picture hanging device by which the picture can be adjusted in vertical height relative to the wall and by which it can be leveled and maintained in a level position.

Another object of the invention is to provide a picture hanging device by which the picture can be easily mounted in a temporary position on a wall and subsequently can be moved to the exact horizontal position in which it is intended to be mounted.

The objects of the invention are accomplished by a device for securing objects in which a flexible elongated strap has a plurality of teeth and a latch mechanism which slidably receives the strap. The latch mechanism has a lock element that engages the teeth in the strap to prevent movement in the opposite direction. A separate slide element is provided in one embodiment of the invention for disengaging the teeth so that the latch mechanism can be moved freely relative to the strap in both directions. In another embodiment of the invention a pivot member is provided by which the latch mechanism may be tilted relative to the strap so that the latch mechanism and strap may be moved freely in opposite directions relative to each other.

The embodiments of the invention are particularly adapted for use in hanging pictures and preferably can be used in pairs so that the pictures can be easily mounted on a wall and can be readily leveled to selection position without requiring reaching behind the picture frame to properly position hangers or to release mechanism to remove pictures from a wall.

The preferred embodiments are illustrated in the drawings in which:

BRIEF DESCRIPTION OF THE DRAWINGS

FIG. 4 is a view of the securing device as viewed in FIG. 2 but at a greatly enlarged scale;

FIG. 5 is a back view of the arrangement in FIG. 4;

FIG. 6 is a view similar to FIG. 4 showing another condition of operation;

FIG. 11 is a cross-sectional view similar to FIG. 4 showing still another embodiment of the invention;

FIG. 12 is a view similar to FIG. 5 but showing the embodiment in FIG. 11;

FIG. 13 is a cross-sectional view at an enlarged scale and in cross-section showing the unlatched position of the securing device in FIGS. 11 and 12;

FIG. 14 is a view similar to FIG. 2 showing the released condition of the embodiment in FIGS. 11 through 13;

FIG. 15 illustrates another embodiment of the invention for use with metal picture frames showing the rear of the frame;

FIG. 16 is a view at an enlarged scale of one of the securing or hanger devices seen in FIG. 15;

FIG. 17 is a view of a portion of the construction seen in FIG. 15 but at a slightly enlarged scale;

FIG. 18 is a cross-sectional view taken on line 18—18 in FIG. 16;

FIG. 19 is a perspective view of a locking element shown separately from the remaining structure in FIG. 16;

FIG. 19a is a cross-sectional view at an enlarged scale showing a portion of FIG. 18.

FIG. 20 is a cross-sectional view taken on line 20—20 in FIG. 16;

FIG. 21 is a view of the slide element as seen in FIG. 16 but separate from the remaining structure;

FIG. 24 is a view of an elongated element used in the hanging device seen in FIGS. 16 and 23;

FIG. 25 is a view partially in cross-section taken on line 25—25 in FIG. 24;

FIG. 26 is a view of a modified mounting structure for hanging devices used with wooden panels of picture frames; and FIG. 27 is a cross-sectional view taken on line 27—27 in FIG. 26.

DETAILED DESCRIPTION OF THE PREFERRED EMBODIMENTS

Figure 1:
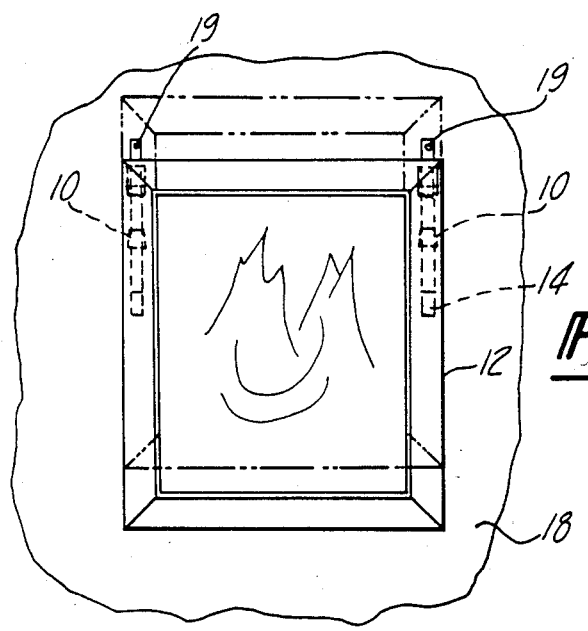
FIG. 1 is a picture frame using the securing devices embodying the invention secured to a wall.
Figure 2:
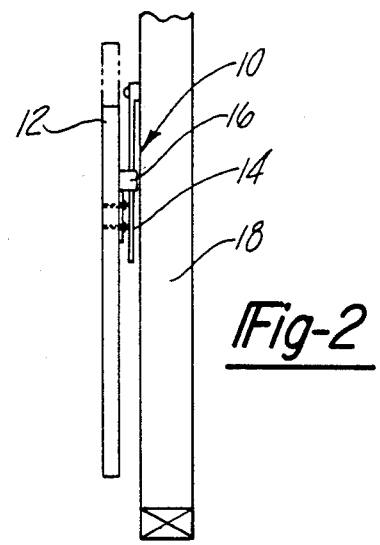
FIG. 2 is a side view of the picture frame and wall in FIG. 1.

The devices for securing objects are designated 10 and shown in use for hanging a panel such as a picture frame 12. Each of the securing devices 10 comprises an elongated flexible strap element 14 and a latch mechanism 16 slidable on the strap 14. The strap 14 is adapted for connection to a support such as a wall 18 and a latch mechanism 16 is secured to the picture frame 12.

As seen in FIGS. 4 and 5 the strap 14 is elongated and has a plurality of uniformly spaced teeth 20 which extend generally transversly of the strap 14. The upper end of the strap 14 is provided with an opening 22 which is adapted to receive a hook member 24 which can be secured to the wall 18 by means of a nail 19 passing through the hook member 24 and anchored in the wall 18.

The strap 14 slidably receives the latch mechanism 16 which includes a body portion 28 formed integrally with a mounting tab 30 which can be provided with openings 32 to receive fasteners such as screws 34 by which the latch mechanism 16 can be connected to the object to be hiring, namely the picture frame 12. The body 28 forms a recess 36 receiving the strap 14 and a slide element 38. The body member 28 also is provided with a latch element 40 which is formed integrally with the remainder of the latch mechanism 16 but is hinged at 42 relative to the body member 28. The latch element 40 is provided with a plurality of teeth 44 which are engageable with the teeth 20 on the strap 14 to prevent movement of the latch mechanism 16 downwardly as viewed in FIG. 4 relative to the strap 14 but permits movement in the opposite direction, that is, upwardly relative to the strap 14.

The slide element 38 has a base portion 46 merging with side flanges 48 disposed to opposite sides of the latch element 40. An end flange 50 extends at right angles to one end of the base portion 46 and another end flange 52 extends at a slight angle to the other end of the base portion 46. The base portion 46 is provided with a rectangular opening 54 which receives the latch element 40 when the slide element 38 is in the position viewed in FIG. 4. The slide element 38 can be moved from the position in FIG. 4 to the position seen in FIG. 5 to bring the base portion 46 adjacent to the opening 54 between the latch teeth 44 and the teeth 20 on the strap 15. In the latter condition, the latch mechanism 16 can be moved in opposite directions on the strap 14.

The slide element 38 is moveable between its two positions, that is a hold or latching position which can be considered the first position as illustrated in FIG. 4 and a sliding or second position as illustrated in FIG. 6. The slide element 38 is put in either its first or its second position through means of engagement with stops formed at opposite ends of the strap 14. One of the stops at the upper end of the strip 14 is afforded by the hook member 24 when the strap is in a mounted position relative thereto. In other words, upon movement of the latch mechanism 16 upwardly relative to the strap 14, the latch element 40 will ratchet relative to the teeth 20 and upward movement of each element 40 can continue until the end flange 50 of the slide element 38 engages the hook member 24. This causes the slide element 38 to be moved relative to the body 28 so that the base portion 46 adjacent to the opening 54 comes between the complementary teeth 20 and 44. This permits the latch mechanism 16 and therefore the attached picture frame 12 to be moved downwardly relative to the strap 14 to the bottom end of the strap 14. As the latch mechanism 16 approaches the lower end of the strap the end flange 52 comes into engagement with an end stop 58 molded integrally with the strap 14. Such movement causes the slide element 38 to be returned to a position in which the rectangular opening 54 is in alignment with the latch teeth 44 so that the teeth 20 and teeth 44 can come into engagement with each other. Thereafter the frame 12 together with the latch mechanism 16 can be moved upwardly in increments if desired to a selected position and when such movement stops the latch teeth 44 engage the strap teeth 20 and prevent downward movement of the frame 12 relative to the wall 18.

Figure 3:
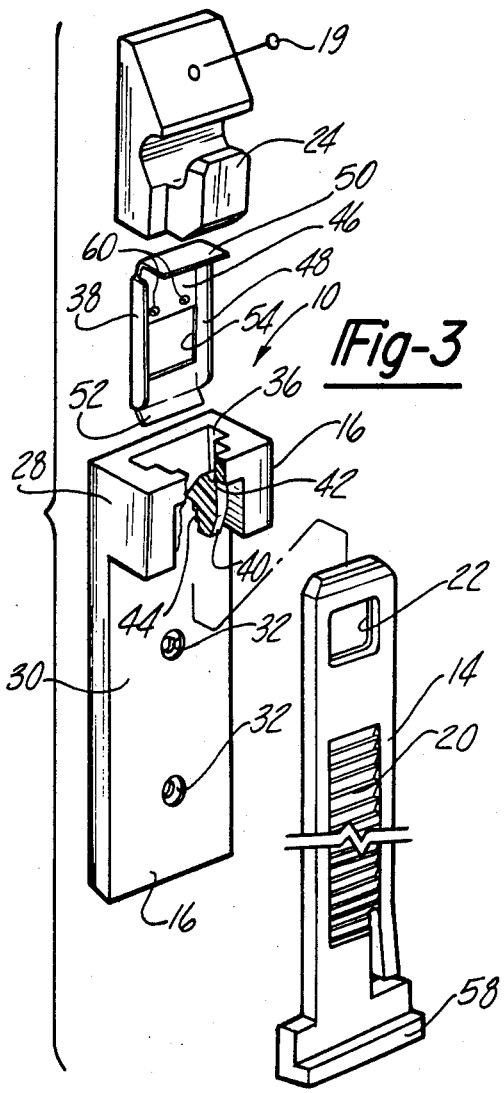
FIG. 3 is an enlarged perspective view partially in cross-section of the securing device.

After the slide element 38 moves to its first position illustrated in FIG. 4 it is held in that position by detents 60 which also are seen in FIG. 3. The detents 60 are protrusions which either engage the teeth 44 on the latch element 40 to hold the slide element 38 in its second position which prevents engagement of the complementary teeth 44 and 20 with each other or the detents act to hold slide element 38 in its first position as viewed in FIG. 4 in which the detents 60 will engage the latch element 40 to prevent movement of slide member to its second position.

With a pair of securing devices 10 attached to opposite sides of the picture frame 12 opposite ends of the frame can be adjusted independently of each other to achieve an accurate horizontal position of the picture frame relative to the wall 18.

The procedure by which the picture frame 12 can be mounted on a wall 18 is initiated by attaching a pair of latch mechanisms 16 at corresponding opposite edges of a picture frame 12 by means of fasteners such as the screws 34. If not already assembled, the straps 14 can be inserted into the recesses 36 of the body portions 28. Thereafter the hook members 24 can be inserted into the openings 22 in the strap 14. In that position the upper ends of the straps 14 and the hook members 24 can be exposed above the upper end of the frame 12, as seen in FIG. 1. With the frame 12 and securing devices 10 in that condition, the hook members 24 and picture frame 12 can be placed against the wall in an approximate position after which nails 19 can be inserted and embedded in the wall 18. This will suspend the picture frame 12 in a temporary position as shown in full line in FIG. 1 with the hook members 24 and nails 19 visible above the upper edge of the picture frame 12. However, the frame can be inched upwardly until the hook members 24 and nails 19 are concealed behind the picture frame 12 as shown in FIG. 1 in phantom line and the frame 12 can be finally leveled by operating the devices 10 separately and independently of each other. This procedure in hanging the frame 12 requires that the frame be initially placed at a position slightly lower than its final intended position on the wall 18.

Both the strap 14 and the latch assembly 16 can be formed of the same plastic material whereas the slide element 38 can be made of thin sheet metal.

Figures 7, 7A, 8:
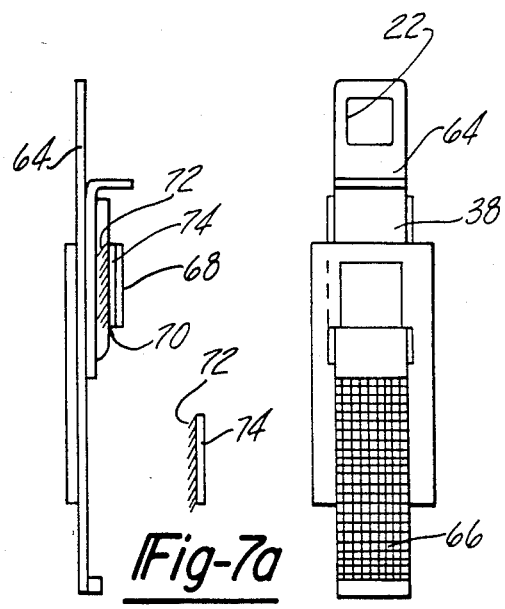
FIG. 7 is a view similar to FIG. 6 showing another embodiment of the invention.
FIG. 7a is a view of a portion of the structure seen in FIG. 7.
FIG. 8 is a view similar to FIG. 5 of the embodiment in FIG. 7.

Referring now to FIGS. 7 through 8, another embodiment of the invention is shown in which the principal of operation is essentially the same and the same results are acheived. In this instance however, a strap 64 includes a portion of wire mesh or screen 66 which extends for substantially the full length of the strap 64 and replaces the teeth 20 of the prior embodiment. A latch mechanism 68 which in most respects is similar to the latch mechanism 16 substitutes a different form of latch means 70 for the latch elements 40 of the prior embodiment. In this instance the latch means 70 is made of a stiff fabric pile having fibers 72 which tend to remain oriented in one direction relative to the base 74 as seen in FIG. 7. The latch mechanism 68 incorporates a slide element 38 identical with the slide element 38 of the prior embodiment. Movement of the slide element 38 between its first and second positions tends to permit the fibers 72 to become engaged with the openings in the screen 66 or to be separated from the screen 66 by the closed base portion 46 of slide 38.

In the prior embodiments of the invention illustrated in FIGS. 1 through 8, removal of the picture frame 12 from the wall 18 requires disengagement of the openings 22 in ends of straps 14 and 64 from the hook elements 24. Reversal of the procedure attaches the picture frame to the wall.

Figure 9:
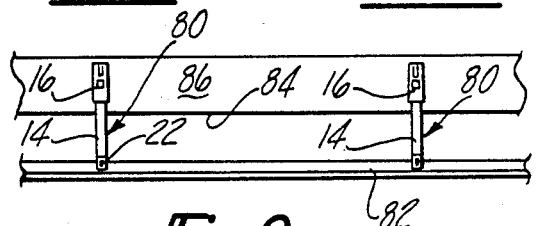
FIG. 9 shows a modification of the embodiments seen in FIGS. 3 and 6 as used for suspending ceiling framework.

Although the securing devices 10 are particularly adapted for use in the hanging of pictures, modified forms identified at 80 in FIG. 9 are useful for suspending framework 82 the type used for ceilings suspended below existing ceilings 84. In this instance the latch mechanism 16 is inverted and fastened to the side of rafters 86 instead of the rear of a picture frame. After the straps 14 are inserted in the latch mechanism 16 the end of the strap at the opening 22 can be fastened to the frame or grill work 82. In this particular instance the securing devices 80 and slide elements 38 can be moved manually to lock and release the strap 14 from the latch element 16 to bring about a leveling of the framework 82.

Figure 10:
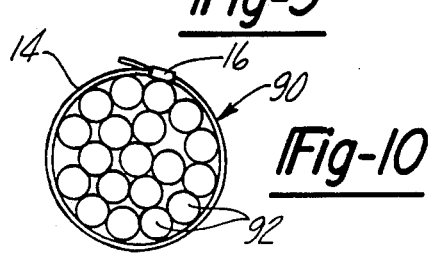
FIG. 10 shows a further modification of the embodiments seen in FIGS. 3 and 7 as used to secure objects to each other in a bundle.

A further modification of the embodiments shown in FIGS. 1 through 8 is illustrated in FIG. 10 in which the latch mechanism 16 is formed integrally with the end of the strap 14 forming the opening 22. This forms a bundling strap 90 having a closed loop with the latch mechanism 16 at one end of the strap 14 so that a plurality of objects such as wires 92 can be bundled together and if desired, held relative to a support. Release of the securing device 10 from the bundle of objects such as wires is accomplished by manually moving the slide member 38 between its latched and released positions.

Referring now to FIGS. 11 through 14, still another embodiment of a securing device 110 is disclosed in connection with its use with panels such as picture frames 112. Each of the securing devices 110 comprises an elongated flexible strap 114 and a latch mechanism 116 slidable on the strap 114. The strap 114 is adapted for connection to a wall 118 and the latch mechanism 116 is secured to the picture frame 112.

The strap 114 can be identical to the strap 14 but as shown in FIGS. 11 and 12 has uniformly spaced teeth 120 extending transversely of the full width of the strap 114. The upper end of the strap 114 is provided with an enlarged portion 121 which can receive a fastener such as a nail 122 by which the securing device 110 can be mounted on the wall 118. It will be apparent that a hook member 24 and an opening 22 in the end of the strap 114 can be substituted as in the embodiment in FIGS. 4 through 6.

The strap 114 slidably receives the latch mechanism 116 which includes a body portion 124 formed integrally with a base member or mounting tab 126 which can be provided with openings to receive fasteners 128 by which the latch mechanism 116 can be attached to the rear of a picture frame 112. The body member 124 includes a pair of side walls 130 spaced to opposite sides of the strap 114 and integral with a transversly extending pivot member 132 and an end wall 134. The pivot member 132 and end wall 134 form an opening 136 which receives the strap 114. A latch element 140 is attached to the end wall 134 and between the side walls 130 and can flex a limited amount relative to the end wall 134. The latch element 140 is provided with teeth 142 which engage complementary teeth 120 on the strap 114. Such engagement prevents downward movement of the picture frame 112 relative to the strap 114 but permits upward ratcheting movement during which time the latch element 140 is free to flex so that the teeth 142 and 120 can disengage and re-engage. Disengagement of the teeth 142 from the teeth 120 so that the picture frame 112 can be moved upwardly or downwardly relative to the strap 114 is brought about by tilting the frame 112 relative to the wall as seen in FIGS. 13 and 14. When the frame 112 is tilted the strap 114 is retained between the pivot member 132 and end wall 134 in the opening 136 but the teeth 142 move out of engagement with the teeth 120. In such tilted attitude the frame 112 can be moved upwardly or downwardly relative to the strap 114 to a desired location. When the frame 112 is returned to a position substantially parallel to the wall 118 the teeth 142 re-engage with the teeth 120 to prevent downward movement of the frame 112. However, upward ratcheting movement is permitted to bring the frame 112 to selected positions relative to the wall 118. A picture frame can be mounted in the same manner with the securing devices 110 as with the devices 10, that is, strap 114 is allowed to project above the frame 112 to permit fasteners such as the nails 122 to secure the straps 114 to a wall. Once secured the frame can be inched upwardly so that the frame is adjusted to a level position. If it is desired to remove the frame 112 from the wall, it is simply necessary to tilt the frame 112 as seen in FIG. 14 and to slide the frame downwardly relative to the straps 114 until the strap 114 passes through the opening 136. Replacement of the frame 112 on the wall simply requires reinsertion of the straps 114 into the openings 136 in the latch mechanisms 116. Thereafter the picture frame 112 can be moved upwardly parallel to the wall 118 to a selected position and released at a selected location at which location the frame 112 will be retained relative to the wall 118.

As seen in FIG. 15, another embodiment of the invention is in the form of hanger assemblies 148 used in association with the rear of panels or pictures framed with metal frames 150 which are commonly available commercially. Such metal frames 150, which are available commercially, are made up of elongated side members 151 having a typical cross section as illustrated in FIG. 18 although dimensions may vary slightly. The cross sections of such picture frames 150 have a flange 152 and a side edge 154 at right angles to the flange 152 which forms the visible portion of the frame 150 and the border for the panel or the framed subject matter, such as a mirror or picture 156. The cross section of the frame 150 also includes a base portion 158 forming the bottom of a rearwardly opening channel 160. The opening to the channel 160 is defined by parallel flanges 162 and 164 which also serve to partially close the channel 160.

As seen in FIG. 17, the partially closed channel 160 of adjoining side members 151 receives the legs of a right angle bracket 166 at each of the four mitered corners 168 of the frame 150. The angle brackets 166 are held in position by screws 170 threaded in brackets 166 to engage the bottom of the channel 160 and clamp the brackets 166 between the flanges 162, 164 and the base 158 of the channel 160.

The subject matter of the panel or picture 156 is held in position against the flange 152 by spring clips indicated at 172 in FIG. 18 acting against the base 158 and resiliently forcing the picture 156 against the flange 152.

The hanger assemblies 148 are intended to be used in pairs at the left and right side of a frame 150. The hangers 148 are substantially identical but are formed as right and left assemblies. Consequently, only the hanger 148 at the rear, right side of the frame 150 will be described.

The hanger assemblies 148 include a mounting structure 174 which is adapted to be detachably connected to one of the vertical sides 151 of the frame 150 to support an elongated hanger element 176 for vertical adjustable movement relative to a latch mechanism 178 forming part of the mounting structure 174.

The means by which the mounting structure 174 is attached to the frame 150 includes a groove 180 as seen in FIG. 18 which receives the edge of the outer flange 164. A metal clip 182 acts on the flange 162 in opposition to the groove 180 engaged with flange 164. Metal clip 182 is seen separately in FIG. 19 and has a pair of legs 184 the ends of which have flanges 186 to grip the inner side of the inner flange 162. For that purpose, the mounting structure 174 is provided with a pair of openings 188 (FIG. 16) through which the pair of legs 184 pass. The metal clip 182 is fitted with a screw 190 the tip of which is guided in a groove 192. By moving the metal clip 182 away from the flange 164 it is moved into engagement with the edge of the inner flange 162. Subsequent tightening of the screw 190 brings the flanges 186 (FIG. 18) into clamping engagement with the underside of the inner flange 162 and holds the entire mounting structure 174 in a selected fixed position longitudinally of the side member 151.

This arrangement in which the metal clip 182 is infinitely adjustable throughout its full range, permits attachment of the hanger assemblies 148 to metal picture frames having a relatively large range of differences in dimensions.

The screw 190 has a special shape permitting it and clip 182 to be locked in a selected position and at the same time facilitating easy guided movement of the metal clip 182 relative to the mounting structure 174. The screw 190 has a sharp tip 191 surrounded by an annular shoulder 193. As best seen in FIG. 19a the annular shoulder 193 engages opposite edges of the groove 192 to maintain the sharp tip 191 out of engagement with the bottom of the groove. This permits easy sliding movement but when the screw 190 is fastened by tightening, the sharp tip 191 bites into the bottom of the groove 192 and the annular shoulder 193 deflects and seats in the edges of the groove 192 since the plastic material forming the mounting structure 174 is substantially softer than the metal screw 190.

The elongated hanger element or stop 176 is slidably supported and held in position relative to the mounting structure 174 by the latch mechanism 178. The latch mechanism 178 forms an opening 194 to slidably receive the strap 176.

The strap 176 also is located and guided relative to the remainder of the mounting structure 174 by a pair of parallel guide rails 195.

The latch mechanism 178 includes a latch element or pawl 196 which is provided with teeth 198 engageable with the teeth 200 on the strap 176 in much the same manner as the teeth 44 and teeth 20 of the embodiment seen in FIG. 3. As in the prior embodiments of the invention, the entire mounting structure 174 is made of plastic material and in the as-molded condition the pawl 196 is resiliently urged into engagement with the strap teeth 200.

The latch mechanism 178 also incorporates a slide member 202 which operates in a manner similar to the metal slide element 38 in FIG. 3 but is made of plastic material. The slide member 202 is received in the opening 194 and is disposed between the pawl 196 and the teeth 200 on the elongated hanger element 176. The slide member 202 has an irregularly shaped opening 204. As seen in FIG. 21, one end of the opening 204 has a shelf portion 206 which is generally rectilinear and has two of its four edges formed integrally with the remainder of the slide member 202. At one side of the shelf 206, the opening 204 extends substantially the full length of the slide member 202 and affords flexibility of the side portion 208 relative to the remainder of the slide member 202. The flexibility permits a lateral movement and operation of a detent projection 210 and recess 211 which acts with a complementary projection 212 (FIG. 16) formed on the latch mechanism 178 to one side of the opening 194 receiving the elongated hanger element 176. The complementary detent projections 210 and 212 act to hold the slide member 202 in one of the two operating positions of the slide member 202.

The shelf 206 performs the same function as the base portion 46 of the metal slide 38, that is, it is moved between two positions one of which separates the pawl teeth 198 and strap teeth 200, as seen in FIG. 20, and another position, as seen in FIG. 16, in which the pawl teeth 198 project through the opening 204 permitting the complementary teeth 198, 200 to engage. As in the prior embodiments of the invention, engagement of the pawl teeth 198 and strap teeth 200 permits upward movement of the latch mechanism 178 and therefore the frame 150 to which it is attached relative to the elongated strap element 176 but prevents movement downwardly in the opposite direction. On the other hand when the shelf portion 206 is between the pawl teeth 198 and strap teeth 200, the mounting structure 174 can be moved in both directions relative to the elongated element 176.

The slide member 202 is moved between its two positions by movement of the mounting structures 174 relative to the elongated hanger elements 176 so that the slide member 202 engages either a stop 213 at the bottom of elements 176 or a stop portion 215 at the upper end of hanger elements 176. During such movement of the slide member 202 the bottom of the relatively thin shelf 206 moves in close proximity to teeth 200 and by forming the shelf 206 with an angled edge 215 which is continuously out of alignment with the transversely extending teeth 200, interference with the teeth 200 is avoided.

The upper end of the elongated element 176 is held in fixed but detachable position relative to a wall 219 by a hook-like hanger bracket 214. The bracket 214 has a body portion 216 forming a hook 218 which receives an elongated opening 220 (FIG. 20) in the upper end of the hanger element 176. The bracket 214 is held in fixed position relative to a selected location on a wall 219 by means of a pair of fasteners 222 and 224 in the form of nails. The nail 222 is disposed at an angle to the wall 219 and the nail 224 extends horizontally. The nails 222 and 224 converge toward each other and are in proximity to each other at their ends within the wall 219. This provides a wedging action which securely holds the bracket 214 in position and prevents loosening of the hanger nail 222 which otherwise might occur.

The bracket 214 also includes a keeper element 226 which is molded integrally with the remainder of the plastic bracket 214. The keeper element 226 is in the form of a hook which engages the lower end of the opening 220 in opposition to the opposite edge of the opening 220 engaged by the hook 218.

The elongated opening 220 forms an eye portion receiving the hanger bracket 214 and is supported at the upper end of the elongated element 176 by a frame portion 221 as seen in FIG. 16. The sides of the frame portion 221 are capable of deflecting from the full line to the left as illustrated in broken line position. Although not shown it will be understood that the sides of the frame portion 221 may deflect also to the right. During such deflection the elongated opening 220 retains a parallel relationship with the elongated strap 176 to facilitate hanging of panels as will be described.

Referring to FIG. 15 the procedure for hanging a panel with a metal frame 150 is to attach both a left hand and right hand mounting structure 174 to opposite sides of the frame 150 so that when the straps 176 are fully extended relative to the mounting structures 174, the upper ends of the elongated elements 176 which include the frame portion 221 are exposed above the upper edge of the frame 150. In the fully extended position the stops 213 on the ends of the strap 176 will be in engagement with the slide 202 associated with the mounting structures 174 so that the teeth 198 on the pawl 196 can engage the teeth 200 on the strap 176 as viewed in FIG. 16. With the strap 176 fully extended relative to the remainder of the mounting structure 174 and with the hooks 218 in the eyes or openings 220, the bracket 214 will extend above the upper edge of the frame 150, can be fastened to the wall 219 by means of nails 222 and 224 (FIG. 20).

During attachment of upper ends of the straps 176 to a wall 219, the elongated elements 176 are parallel to each other. Referring to FIG. 16 the spacing of the rails 195 is greater than the width of the elongated member or strap 176. To maintain the strap 176 parallel to the rails 195, therefore parallel to each other, the elongated members 176 are provided with a finger 228 which resiliently presses against one of the rails 195 and urges the strap 176 against the other rail 195. As a result, the elongated member 176 is maintained parallel to the guide rails 195 and when a pair of hanger assemblies 148 are attached to the frame 150 the elongated members 176 are in substantially parallel relationship with each other. Consequently when the bracket elements 214 are fastened to a wall 219, their horizontal spacing will be substantially equal to the horizontal spacing of the latch mechanisms 178 associated with the frame 150. As a result, the elongated elements 176 will remain relatively parallel to each other during the hanging operation and subsequently during the adjusting operation.

After the brackets 214 are fastened to the wall 219 by use of pairs of nails 222, 224 the frame 150 can be adjusted in substantially the same manner as described in connection with FIG. 1. In other words, the frame 150 can be inched upwardly from its temporary position to conceal the entire hanger assembly 148 behind the panel or frame 150. The frame 150 can be finally leveled and adjusted by moving one side of the frame 150 or the other which will operate the mounting structures 148 separately and independently of each other. During the adjusting portion of the hanging process in which the frame 150 is moved upwardly relative to the elongated elements 176, the ratcheting of the pawl 196 relative to the teeth 200 is audible. This makes it possible to move first one and then the other side of the frame 150 in increments of the width of one tooth 200.

Preferably all of the components of the mounting structures 148 are made of plastic material except for the clip 182 and screw 190 which are preferably formed of metal.

When it is desired to remove the panel or frame 150 from the wall 219, it is first moved upwardly to its maximum extent so that both of the slide members 202 move into engagement with stop portion 215 of each of the associated elements 176 to furnish an abutment to move the slide member 202 to a second position illustrated in FIG. 20. In that position the shelf 206 is moved between the pawl 196 and the strap teeth 200 to inactivate the latch mechanisms 178. Thereafter the frame 150 can be moved freely downwardly relative to the elongated elements 176 until the two brackets 214 become exposed above the frame 150. This permits the keeper elements 226 (FIG. 20) to be manually deflected to disengage the hanger strap 176 from hooks 218 and permit removal of the frame 150 from the wall 219.

Replacement of the frame 150 to hang it on the wall 219 is accomplished by reengaging the opening 220 of the hanger element 176 with hooks 218. The slide member 202 will have been moved into engagement with stop 213 so that pawl 196 can engage teeth 200. Thereafter, the frame 150 can be moved upwardly to conceal the brackets 214 and opposite sides of the frame 150 can be inched upwardly separately to level the frame or panel 150 horizontally.

Figure 22:
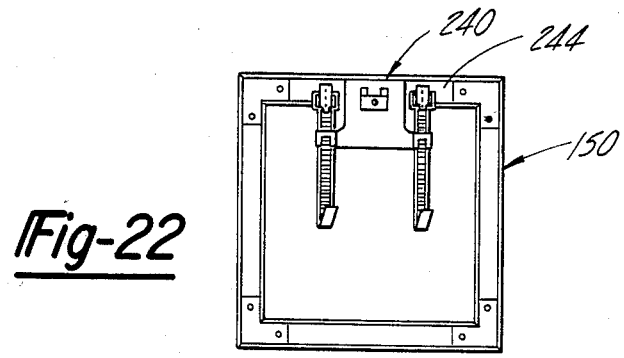
FIG. 22 is a view of still another embodiment of the invention for use with metal picture frames.
Figure 23:
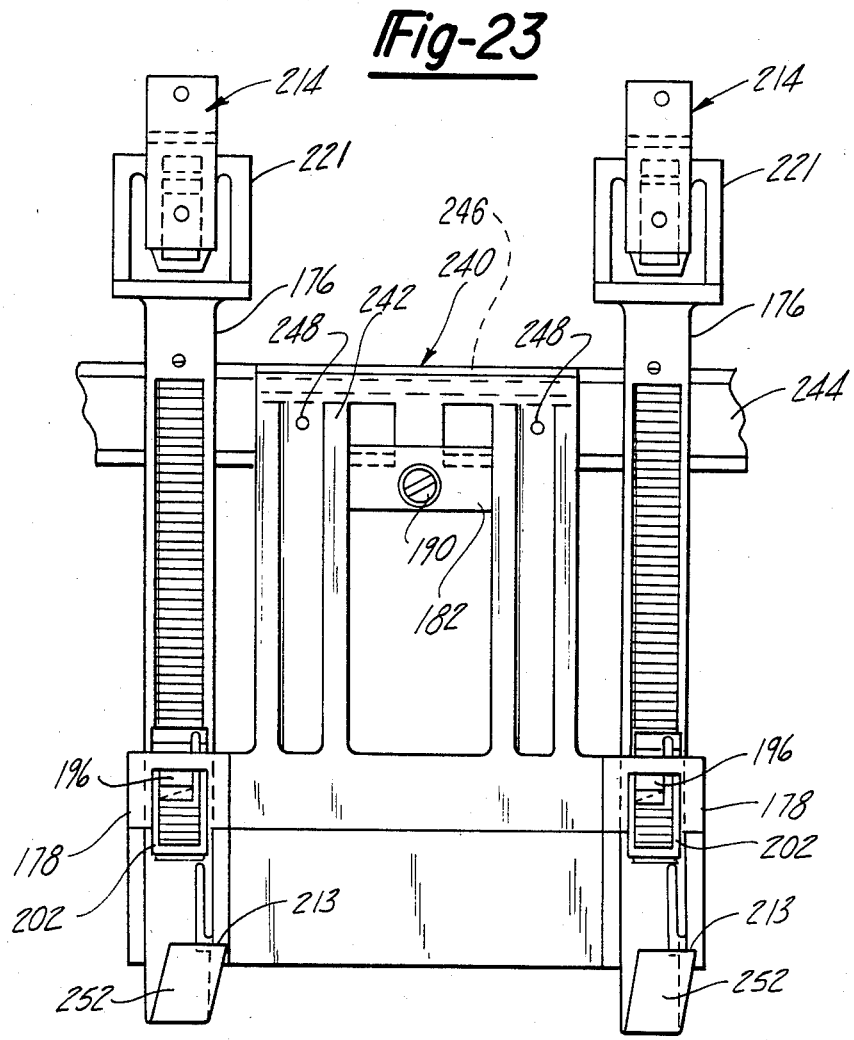
FIG. 23 is a view at an enlarged scale of the securing or hanging device seen in FIG. 22.

Referring to FIGS. 22 and 23, still another embodiment of the invention is shown in which a pair of elongated hanger elements 176, identical to those in the embodiment of FIG. 15 are used with a hanger assembly 240. The hanger assembly 240 includes a body member 242 which is adapted to be connected to the upper edge 244 of a metal frame 150. The body member 242 is provided with a pair of spaced apart latch mechanisms 178 which are substantially identical with the latch mechanisms forming part of the mounting structure 174 in the embodiment seen in FIGS. 15 through 21. With the hanger assembly 240, the latch mechanisms 178 protrude to opposite sides of the body member 242 so that the elongated hanger elements 176 are disposed substantially parallel to each other. The hanger assembly 240 also incorporates a pair of slide members 202.

The hanger assembly 240 is attached to the metal frame 150 by means of a groove 246 which is formed in substantially the same manner as the groove 180 seen in FIG. 18 and extends for the full width of the body member 242 and therefore for substantially the entire distance between the spaced hanger elements 176. The groove 246 engages the outer flange 164 of the upper edge 244 of the frame 150 and is held in that position by metal clip 182 and screw 190 as in the prior embodiment. The principal difference between this and the prior embodiments is that the pair of hanger elements 176 form part of a single hanger assembly 240 which can be attached at a single point on a metal frame 150 midway between opposite sides by use of a single attaching screw 190. Once the hanger assembly 240 has been attached to a midpoint of the upper frame member 244, the operation of hanging, leveling, removal and replacement on a wall are the same as with the embodiment in FIGS. 15 through 21.

Although the embodiments of the invention disclosed in connection with FIGS. 15 thorough 23 are for use with metal frames having a particular channel shaped cross-sectional configuration, it should be understood that certain modifications can be made for attachment to wooden frames or panels that will accept fasteners such as screws or nails. For example, with respect to the embodiment seen in FIG. 23 in association with a metal frame 244, the body member 242 can be provided with openings 248 to accept screws or nails. In that event the screw 190 and clip 182 are not required. Although a similar modification could be made of the mounting structure 174 of the embodiment seen in FIG. 16, a modified mounting structure 174a can be provided as seen in FIG. 26. The illustrated mounting structure 174a is for use at the rear, right hand edge of a panel or picture frame and is provided with a plurality of holes 236 selected ones of which can receive nails or screws for attachment to a wooden frame or panel. In all other respects the mounting structure 174a is identical to mounting structure 174 in that it is adapted to receive an elongated element 176 between parallel guide rails 195 and is provided with a pawl 196 for engaging teeth 200 on an elongated member 176.

During the panel hanging procedure it is conceivable that the upper ends of the elongated straps 176 may be positioned and fastened to the wall at a spacing which differs from the positions of the latch mechanisms 178 associated with the arrangements illustrated in FIGS. 15 and 22. In that event, after the panel or picture is attached to the wall and the panel or picture is moved upwardly, the difference in the horizontal position of the latch mechanism and of the bracket portions 214 could cause a distortion of the parts. To accomodate such misalignment and to avoid the necessity for careful measurement of the placement of the bracket structures 214, provision is made for lateral displacement of the opening or eye 220 relative to the strap 176 as best seen in FIG. 16. When the latch mechanisms 178 and the bracket elements 214 are properly aligned the opening or eye 220 will appear as illustrated in full line. However, if there is a variance between the horizontal spacing, the latch mechanisms 178 will laterally displace the frame portion 221 to the left as shown in broken line or in the opposite direction to the right which is not illustrated. Such lateral displacement will occur simultaneously and in opposite directions for a pair of elongated strap elements. With this arrangement substantial misalignment is accomodated without placing unnecessary stress on the parts or breaking of any of the components during the hanging operation.

Referring to FIG. 24 the stop element 213 at the lower end of the strap or elongated member 176 is formed by folding a portion 252 along a hinge line 254 which is disposed at an angle to the elongated strap 176. In the folded condition as illustrated in FIG. 25 the portion 252 is sonically welded to a protrusion 258 to permanently retain it in its folded position. Such folding displaces the stop portion 213 slightly to one side of the elongated element 176. This arrangement permits easy insertion of the elongated element 176 into the opening 194 in the latch mechanism 178 but after the portion 252 is folded and welded in position the stop 213 also prevents removal of the elongated element 176 from the remainder of the structure.

To facilitate the mounting procedure and to insure that sufficient amount of the elongated member 176 will protrude above the frame for the attachment of the bracket 214 to a wall locating holes 260 are provided which serve as a marking to align the elongated element 176 with the top of the frame 150.

The embodiments of the invention in FIGS. 1 through 8 and 11 through 27 all make it possible to hang a picture or a panel on a wall and to adjust the picture or panel and to position it horizontally all without reaching behind the panel to adjust the hanging structure or to release the hanging mechanism by actual contact. Moreover, in the embodiments in FIGS. 11 through 14 the adjustment can be made by tilting the picture frame or panel relative to the wall and in the remaining embodiments the picture frame or panel can be retained parallel to the wall during adjustments.

The embodiments of the invention in which an exclusive property or privilege is claimed are defined as follows:

1. A device for securing objects comprising: an elongated member, a latch mechanism, complementary lock elements on said elongated member and on said latch mechanism engageable with each other to permit movement of said latch mechanism in one direction on said elongated member and prevent movement in the opposite direction, a slide member selectively movable relative to said latch mechanism and longitudinally of said elongated member between first and second positions, said slide member being operable in said first position to permit engagement of said complementary lock elements and in a second position to separate said lock elements from each other to permit movement of said latch mechanism relative to said elongated member in both directions, and means holding said slide member relative to said latch mechanism in a selected one of said first and second positions.

2. The device of claim 1 wherein said means holding said slide member comprises complementary detent portions associated with said latch mechanism and said slide member to releasably hold said slide member in a selected one of said first and second positions.

3. The device of claim 1 wherein said slide member has an opening alignable with said complementary lock elements to permit engagement therethrough, and a shelf adjacent said opening and being moveable between said lock elements to prevent engagement thereof.

4. The device of claim 3 wherein said elongated member is a strap and said lock elements on said strap are teeth extending transversely of said strap and wherein said shelf has an edge portion adjacent said opening disposed at an angle to said teeth to prevent accidental engagement of said slide member with said teeth.

5. A device for securing objects comprising: a flexible, elongated member, a latch mechanism having a recess slidably receiving said elongated member, complementary lock elements on said strap and on said latch mechanism permitting movement of said latch mechanism in one direction on said elongated member and preventing movement in the opposite direction, a slide member selectively movable relative to said latch mechanism between a first position and a second position, abutments disposed at opposite ends of said elongated member to engage said slide member and move it relative to said latch mechanism when said latch mechanism is moved to opposite ends of said elongated member, said slide member being engageable with one abutment at one end of said elongated member to separate said lock elements to permit sliding movement of said latch mechanism in both directions on said elongated member and being engageable with the other abutment at the other end of said elongated member to place said slide member in a condition for engagement of said lock elements and movement of said latch mechanism in said one direction and preventing movement of said latch mechanism in an opposite direction.

6. The device of claim 5 wherein said one abutment is formed in a bracket member adapted to be fastened to a wall or the like and said elongated member depends therefrom.

7. The device of claim 5 wherein said other abutment is formed by folding an end portion of said elongated member to lie parallel to the remainder of said elongated member.

8. The device of claim 1 wherein said lock elements on said elongated member are a plurality of uniformly spaced teeth extending transversely of and are spaced longitudinally of said elongated member.

9. The device of claim 6 wherein said elongated member is detachable from said bracket member.

10. The device of claim 9 wherein said bracket member includes a hook and wherein said elongated member includes an eye at one end to detachable receive said hook.

11. The device of claim 10 wherein said bracket includes a keeper element engageable with said elongated member to hold the latter in locked relationship with said bracket.

12. The device of claim 11 wherein said keeper element engages an edge of said eye and resiliently urges said elongated member downwardly to engage said eye with said hook.

13. The device of claim 9 wherein said bracket member is adapted to be held in position relative to a wall by a pair of fastener elements vertically spaced in said bracket member and converging toward each other within the wall.

14. A device for hanging panels to a wall comprising: an elongated flexible member adapted to be attached to a wall, a latch mechanism slidably receiving said elongated member and adapted to be attached to the rear surface of said panel, complementary lock elements on said elongated member and on said latch mechanism engageable with each other to permit movement of said latch mechanism in one direction longitudinally of said elongated member and prevent movement in the opposite direction, said slide means selectively movable relative to said latch mechanism between a first position in which said complementary lock elements are in engagement with each other and a second position in which said lock elements are separated from each other to permit movement of said latch mechanism relative to said elongated member in both directions and abutments disposed at opposite ends of said elongated member for engagement with said slide member to move the latter between said first and second positions upon movement of said panel.

15. The device of claim 14 wherein said panel has a frame and said frame has a rearwardly opening groove extending parallel to the edges of said frame, said latch mechanism having a portion engageable with one side of said groove, and a clamp element engageable with the other side of said groove, said clamp element being held in selected positions relative to said latch mechanism to secure the latter in fixed position relative to said frame.

16. The device of claim 15 wherein said clamp element is moveable transversely to the opening in said groove to selected adjusted positions.

17. The device of claim 15 wherein said means holding said clamp element in position is a single screw element.

18. The device of claim 17 wherein said screw element has an end portion guided in a groove formed in said latch and extending transversely to said open groove in said frame.

19. Apparatus for hanging panels comprising: a pair of flexible elongated members having one end adapted to be connected in horizontally spaced relation to a support, a pair of latch mechanisms slidably receiving said pair of elongated members, respectively, and being adapted for connection to the rear of said panel in horizontally spaced relationship to each other, complementary lock elements on said pair of elongated members and on said latch mechanisms, respectively, said lock elements being engageable with each other to permit movement of said pair of latch mechanisms in one direction relative to the associated elongated members and prevent movement in the opposite direction, and a pair of slide elements selectively movable relative to said latch mechanisms between a first position and a second position and each operating in a first position to maintain said complementary lock elements in engagement with each other and in a second position to maintain said lock elements separated from each other to permit movement of said latch mechanisms relative to said elongated members in both directions, and means at opposite ends of said elongated members for engaging and moving said slide elements between said first and second positions upon movement of said latch mechanisms to opposite ends of said elongated elements, said pair of latch mechanisms being operable independently of each other.

20. The apparatus of claim 19 wherein corresponding ends of said elongated members are adapted for connection to a support at horizontally spaced locations relative to each other, means permitting lateral deflection of said corresponding ends of said elongated members when the spacing of said latch mechanisms is different than the spacing of said corresponding ends and said latch mechanisms are moved into proximity to said ends.

21. The apparatus of claim 20 wherein corresponding ends of each of said elongated members are provided with an eye portion, said eye portions detachably receiving bracket elements attachable to said support, said eye portions being deflectable laterally relative to said elongated member when the spacing of said latch mechanisms differs from the spacing of said bracket elements and said latch mechanisms and bracket elements are moved into relative proximity.

22. The apparatus of claim 21 wherein said corresponding ends of said elongated members are formed with a frame portion and wherein said eye portion is disposed within said frame portion, said frame portion being flexible to permit lateral displacement of said eye portion relative to said elongated member.

23. The device of claim 19 wherein said pair of elongated members are separately removable from bracket elements fastened to said support.

24. The hanger assembly of claim 14 wherein said control means is moveable between said first and second positions by moving said panel upwardly to place said slide member in said first position.

25. The apparatus of claim 19 and further comprising a mounting member, means for fastening said mounting member to said panel, said pair of latch mechanisms being incorporated and forming part of said mounting member.

26. The device of claim 14 wherein said panel has a groove extending around its perimeter and wherein said mounting member engages one side of said groove, and an adjustable clamp element engageable with the other side of said groove to hold said mounting member in aligned position on said panel.

27. The hanger assembly of claim 25 wherein said panel member has a rearwardly opening groove formed at its perimeter, said mounting member engaging one side of said groove, said means securing said mounting member to said panel including a clamp element adjustable to selected positions to engage the other side of said groove and fastening means holding said clamp element in said selected position to secure said mounting member in fixed relationship to said panel.

28. The hanger assembly of claim 26 wherein said groove has a border formed by parallel, spaced flanges, said mounting member having a slot to receive the edge of one of said flanges, said clamp element engaging the other of said flanges to hold said mounting member in fixed position on said panel.

29. The hanger assembly of claim 28 wherein said slot extends for substantially the full spacing of said elongated members.

30. A hanger assembly for holding a panel member on a wall in which the panel member has a metal frame, said metal frame having a rearwardly opening groove extending around the perimeter of said panel, a mounting structure having a portion extending to one side of said groove, and a clamp element engaging the other side of said groove and held in selected positions to secure said mounting structure in selected positions around the perimeter of said panel, an elongated element slidably supported relative to said mounting structure, the upper end of said elongated member being adapted for fastening to a wall to depend therefrom, a latch mechanism forming part of said mounting structure and normally being in engagement with said elongated element to permit upward and prevent downward movement of said panel relative to said elongated element and said wall, and a slide element associated with said elongated element and said latch mechanism and being moveable between first and second positions, said slide element being operative in said first position to inactivate said latch mechanism to permit movement of said panel upwardly and downwardly relative to said wall and being operative in said second position to permit engagement of said latch mechanism with said elongated element to permit upward and to prevent downward movement of said panel.

31. The hanger assembly of claim 30 wherein said mounting structure is securable to an upper part of said frame to depend therefrom and wherein a second elongated element is supported relative to said mounting structure in horizontally spaced relationship relative thereto.

32. The hanger assembly of claim 30 wherein said latch mechanism is part of a mounting structure secured to a side of said frame, and a second mounting structure securable to the opposite side of said frame to receive a second elongated member, said mounting structures being offset away from the side of said frame and extending toward each other to position said elongated members behind said panel.

33. The apparatus for hanging panels of claim 19 wherein said elongated members are slidably disposed for guided movement between pairs of guide rails, each of said elongated members having means associated therewith and resiliently engaging one of said rails of each of said pairs to urge said elongated member into parallel engagement with the other of said rails of said pair.

34. The apparatus of claim 33 in which said means associated with each of said elongated members is a finger element formed integrally with and extending to one side of the elongated member for resilient engagement with one rail of said pair of rails.

35. A device for securing a member from a support member comprising: a flexible strap connected to one of said members, a latch mechanism slidably receiving said strap and being connected to the other of said members, complementary lock elements on said strap and on said latch mechanism permitting movement of said latch mechanism in one direction on said strap and preventing movement in the opposite direction relative to said strap, and slide means movable longitudinally of said strap relative to said latch mechanism being selectively operable to disengage said complementary lock elements and permit free movement of said members in opposite directions relative to each other.

36. A securing device comprising: a latch mechanism having a body member with an opening therein, a lock element movable relative to said latch mechanism, a flexible strap having one end formed integrally with said body member and a portion slidable in said opening said strap having a plurality of teeth disposed longitudinally of said strap for sequentially engaging said locking element upon movement of the strap in one direction in said opening, and means supported on said latch mechanism and slidable longitudinally of said strap and relative to said lock element between a first position permitting engagement of said lock element with said teeth to permit sliding movement of said latch mechanism in one direction relative to said strap and a second position to prevent engagement of said lock element with said teeth to permit sliding movement of said latch mechanism in both directions relative to said strap.

37. The device of claim 36 wherein said strap and said body member are formed as a unit of plastic material.

38. The hanger assembly of claim 27 wherein said slot extends for a substantial distance and extends parallel to an edge of said panel member to hold said mounting structure in aligned fixed relationship to said panel.

39. The hanger assembly of claim 19 and further comprising a pair of mounting structures adapted to be secured to opposite sides of a panel, said mounting structures incorporating said pair of latch mechanisms, respectively, said mounting structures being offset away from the sides of said panel and extending towards each other to position said elongated members behind said panel.

* * * * *

UNITED STATES PATENT AND TRADEMARK OFFICE
CERTIFICATE OF CORRECTION

PATENT NO. : 4,557,455
DATED : December 10, 1985
INVENTOR(S) : Benjamin C. Benjamin It is certified that error appears in the above-identified patent and that said Letters Patent is hereby corrected as shown below:

Column 3, line 26; "transversly" should be --transversely--

Column 3, line 37; "hiring" should be --hanged--

Column 4, line 2; "strip" should be --strap--

Column 6, line 14; "transversly" should be --transversely--

Column 8, line 3; "stop" should be --strap--

Column 8, line 43; after "slide" insert --element--

Column 10, line 38; "strap" should be --straps--

Column 11, line 17; "thorough" should be --through--

Column 11, line 64; "accomodated" should be --accommodated--

Column 13, line 38; "detachable" should be --detachably--

Signed and Sealed this

First Day of April 1986

[SEAL]

Attest:

DONALD J. QUIGG

Attesting Officer

Commissioner of Patents and Trademarks